United States Patent [19]

Piascinski et al.

[11] Patent Number: 4,493,668

[45] Date of Patent: Jan. 15, 1985

[54] METHOD FOR COMBINED BAKING-OUT AND PANEL-SEALING OF A PARTIALLY-ASSEMBLED CRT

[75] Inventors: Joseph J. Piascinski, Leola; Randolph H. Axelrod; James Mount, both of Lancaster, all of Pa.

[73] Assignee: RCA Corporation, New York, N.Y.

[21] Appl. No.: 458,653

[22] Filed: Jan. 17, 1983

[51] Int. Cl.[3] .............................................. C03B 23/20

[52] U.S. Cl. .......................................... 445/40; 445/45

[58] Field of Search .............................. 445/45, 40, 57

[56] References Cited

U.S. PATENT DOCUMENTS 3,041,127 6/1962 Turnbull .............................. 316/19

3,658,401 4/1972 Files ..................................... 445/31

3,932,011 1/1976 Piascinski ............................. 316/17

4,058,387 11/1977 Nofziger ................................ 65/32

4,154,494 5/1979 Skinner, Jr. et al. .................. 316/4

4,213,663 7/1980 Nubani et al. ......................... 445/40

4,217,015 8/1980 Matsumoto et al. .................. 316/30

4,350,514 9/1982 Akiyama et al. ....................... 65/36

*Primary Examiner*—Nicholas P. Godici

*Assistant Examiner*—Kurt Rowan

*Attorney, Agent, or Firm*—E. M. Whitacre; D. H. Irlbeck; L. Greenspan

[57] ABSTRACT

A method for fabricating a CRT (cathode-ray tube) in which a partially-completed faceplate-panel assembly is baked-out and heat-sealed to a funnel during the same baking cycle. Jets of oxygen-containing gas are directed intermittently into the open neck of the funnel at least during the heating-up period of the heating cycle.

8 Claims, 5 Drawing Figures

METHOD FOR COMBINED BAKING-OUT AND PANEL-SEALING OF A PARTIALLY-ASSEMBLED CRT

BACKGROUND OF THE INVENTION

This invention relates to a novel method for making a CRT (cathode-ray tube) and particularly to a novel method wherein a partially-completed faceplate-panel assembly is baked out and the panel simultaneously heat-sealed to a funnel assembly.

A color-television picture tube, which is a type of CRT, is usually prepared by steps including (a) producing a luminescent-viewing-screen structure on the inner surface of a faceplate panel, (b) baking the panel assembly in air at elevated temperatures to remove moisture and substantially all of the organic matter from the screen structure, (c) heat-sealing the panel to the large opening of a funnel by baking the panel-funnel assembly in air at elevated temperatures, (d) sealing an electron-gun mount assembly into the neck that is attached to the funnel and then (e) exhausting and sealing the assembly.

In order to reduce the cost of making a CRT and also to reduce the amount of fuel needed to make the CRT, it is desirable to combine baking steps (b) and (c). Prior proposals for combining these baking steps have been only partially successful for one or more of the following reasons. Some prior methods are too slow for use in normal factory operation. Some prior methods do not completely remove substantially all of the organic matter in the screen structure or degrade the performance of the viewing screen. Some prior methods produce a discolored seal between the panel and the funnel, which seal may be prone to electrical breakdown in the presence of the electrical fields that are normally present when operating the CRT. The novel method, in a single baking step, removes substantially all of the organic matter from the screen structure, produces an acceptable panel-funnel seal using the normal thermal sealing cycle, does not degrade the performance of the viewing screen and is otherwise compatible with the other steps for making the CRT.

SUMMARY OF THE INVENTION

The novel method, as in some prior methods, comprises heat-sealing a glass faceplate panel to a glass funnel having an open, relatively-narrow neck attached thereto and, at the same time, baking-out substantial amounts of organic matter from coatings on the inside surfaces of the panel and funnel. The heat-sealing and baking-out step is conducted at elevated temperatures in a substantially-quiescent atmosphere. The novel method, unlike any prior method, comprises intermittently directing jets or puffs of oxygen-containing gas into the neck of said funnel during the heating-up period of the heat-sealing step.

The novel method is conducted preferably with dry air at temperatures in the range of 150° to 450° C. By "intermittently" is meant that the jets of gas are flowing for a portion and then are not flowing for a portion of a plurality of successive time intervals. The jets may flow in any direction, but are preferably at a relatively-small angle with respect to the longitudinal axis of the neck of the CRT.

DESCRIPTION OF THE PREFERRED EMBODIMENTS

The steps of the novel method are generally the same as those that are used for making a shadow-mask CRT. Generally, in making a shadow-mask CRT, a glass faceplate panel is heat-sealed to a glass funnel with a devitrifiable glass frit, by the method described, for example, in U.S. Pat. No. Re. 25,791 to S. A. Claypoole to form the bulb or panel-funnel assembly. Prior to heat-sealing the panel to the funnel, a mask assembly is mounted in the faceplate panel, and a viewing screen structure is produced on the inner surface of the panel. Also, the funnel is provided with an internal electrically-conductive coating, which may be comprised of graphite and a binder. The funnel is comprised of a cone adapted to be sealed to the faceplate panel at its larger end and an integral cylindrical neck at its smaller end that is adapted to receive the stem of a mount assembly.

Usually, the viewing-screen structure and panel are baked in air at elevated temperatures to remove moisture and organic matter as a separate step prior to the step of heat-sealing the panel to the funnel. The novel method differs from usual prior methods in that the latter step of heat-sealing is modified so that the purposes of the two steps are carried out with one baking with the resultant savings in labor, equipment, fuel and floor space.

Figure 1:
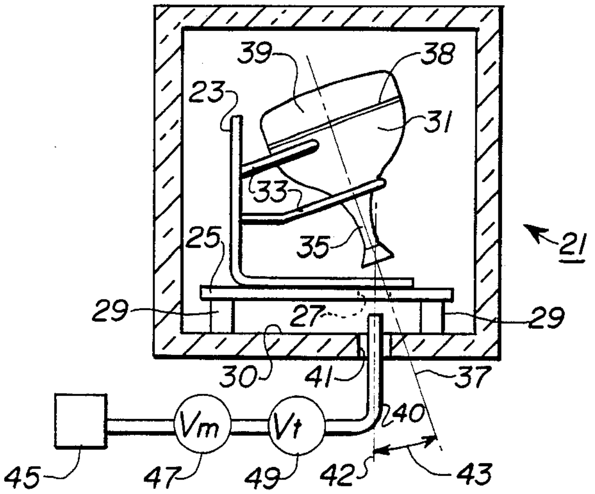
FIG. 1 is a partially-schematic sectional elevational view of a periodic oven for practicing a first embodiment of the novel method.

The novel method may be practiced in a periodic oven, such as the oven 21, shown in FIG. 1, in which the parts to be sealed are supported in a sealing fixture 23, which remains stationary throughout the heat treatment. The sealing fixture 23 comprises a tubular frame which is supported on a refractory ceramic batt 25 having a batt hole 27 therethrough. The batt 25 is supported on a plurality of refractory ceramic blocks 29, which rest on the floor 30 of the oven.

A glass funnel 31 rests in the support arms 33 of the fixture 23 with the neck 35 of the funnel 31 down and the open end thereof up. The neck 35 has a longitudinal neck axis 37, which is at an acute angle to vertical. The open end of the neck 35 is above and spaced from the batt hole 27 in the batt 25. The upper edge of the funnel 31 comprises a seal land, which carries a layer 30 of glass-frit-sealing material. A glass faceplate panel 39 has a matching seal land, which rests on the layer 39 of sealing material.

A tube 40 passes through a small floor hole 41 in the floor 30 of the oven opposite and spaced from the batt hole 27 in the batt 25. The tube 40 has a tube axis 42, which passes through the batt hole 27 and intersects the neck axis 37 at about the open end of the neck 35, at an acute angle 43. The tube 40 is supplied intermittently with air from a source 45 through a manual valve 47 and a time-controlled valve 49. The oven 21 is heated in a controlled manner with electric resistance heating elements (not shown).

To practice the novel method, the various parts are assembled as shown in FIG. 1 with the manual valve 47 open. The atmosphere of the oven 21 is air which is quiescent. The oven 21 is heated up to about 440° C. in about 85 minutes, where that temperature is held for about 55 minutes, after which the oven 21 is cooled down to room temperature in about 150 minutes. During the initial 25 minutes of the heating-up period, no air flows through the tube 40. Then, for the remaining 60 minutes of the heating-up period, when the oven temperature is in the range of 150° to 450° C., the time-controlled valve 49 alternately opens for about 20 seconds and closes for about 40 seconds permitting jets of air to issue intermittently from the tube 40 toward the open end of the neck 35. At the end of the heating-up period, the time-controlled valve 49 is closed and remains closed for the remainder of the heating cycle.

The effect of the intermittent jets of air in a quiescent atmosphere during the heating-up period is to drive out gases that are inside the funnel 31 and to replace them with air. Other techniques have been tried and have been found to be less effective. For example, a continuous jet of air instead of intermittent jets is not as effective because, it is believed, a continuous jet stream appears to trap gases in the funnel instead of driving them out. Also, a turbulent atmosphere in the oven with no jets is not as effective because, it is believed, there is a very poor exchange of gases between the oven atmosphere and inside the funnel through the neck. The neck axis 37 may be at any angle 43 with respect to the tube axis 42. At 0°, when the two axes are parallel, the exchange of gases through the neck 35 is reasonable, but is improved as the angle increases to about 15°. Any oxygen-containing gas may be used, but air is preferred, particularly dry air with a dew point of less than about −40° C.

Figure 2:
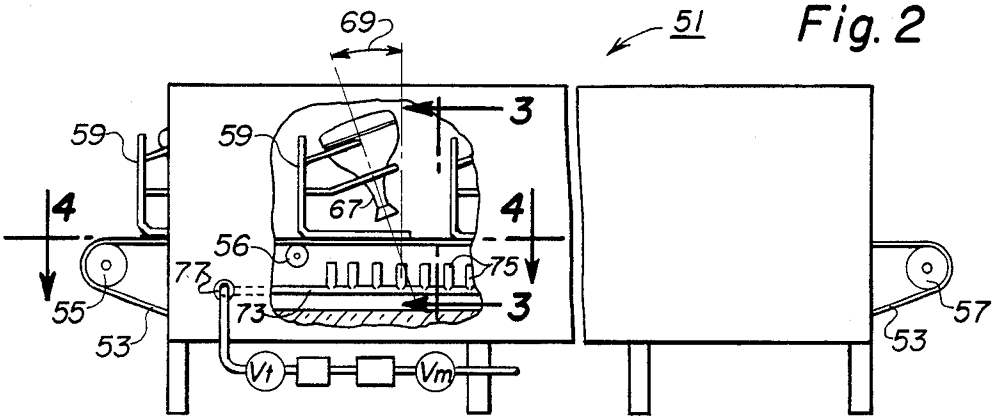
FIG. 2 is a partially-schematic sectional elevational view of a continuous-belt oven for practicing a second embodiment of the novel method.
Figure 3:
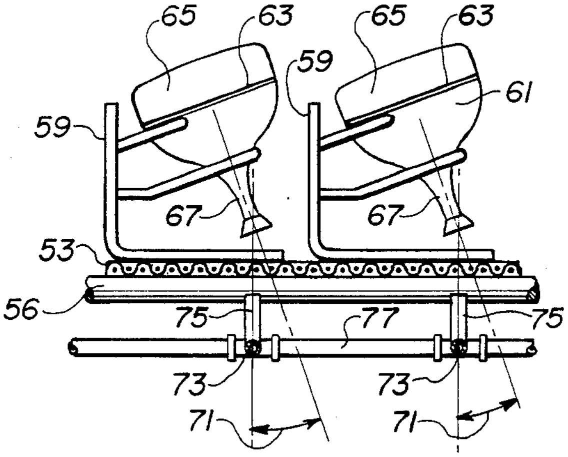
FIG. 3 is an enlarged fragmentary view along section lines 3—3 of FIG. 2.
Figure 4:
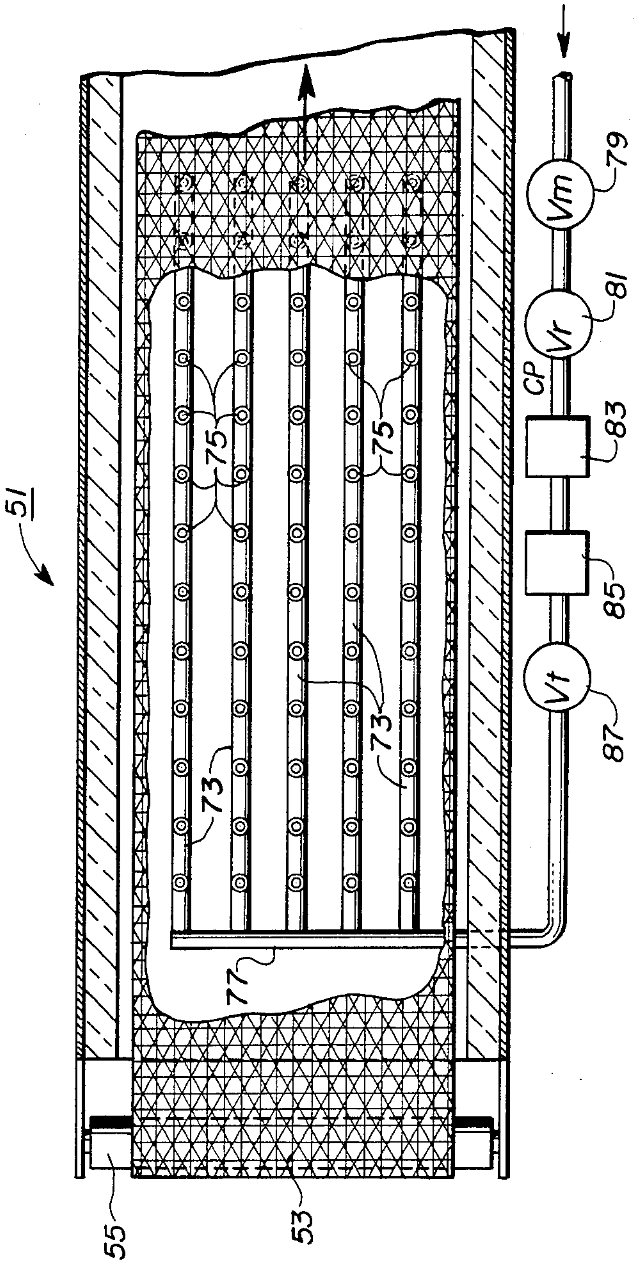
FIG. 4 is an enlarged fragmentary view along section lines 4—4 of FIG. 2.

The novel method may also be practiced in a continuous tunnel oven, such as the oven 51 shown in FIGS. 2, 3 and 4, which comprises a three-zone heated chamber having a relatively quiescent atmosphere except as will be described below with respect to the novel features of the novel method. A steel mesh belt 53 is supported on an idler pulley 55 at the input end and a drive pulley 57 at the output end, which pulleys are located outside the chamber. The belt 53 passes over the input-end idler pulley 55, through the chamber through openings at each end thereof, over intermediate idler pulleys 56 in the chamber, and then over the drive pulley 57. The belt 53 returns under and outside the chamber to the input-end idler pulley 55.

The belt 53 moves through the tunnel oven 51 at a rate such that each point on the belt is in the chamber for about 300 minutes (5 hours), with about 90 minutes in the heating-up zone, about 60 minutes in the central-soaking zone, and about 150 minutes in the cooling-down zone. The rate of movement of the belt and the time spent in the chamber may be varied considerably from those given in this example, as is known by persons of ordinary skill in this art.

As the belt 53 moves, fixtures 59, similar to the fixture 23 shown in FIG. 1, are placed on the belt 53, five fixtures 59 being in a line across the belt 53. Each fixture 53 is then loaded neck down with each funnel 61 having a layer 63 of frit-sealing material on the seal land thereof at its wider end. Then, a faceplate panel 65 having an unbaked-screen structure on its inner surface is placed on the funnel 61 with its matching seal land on the sealing-material layer 63. Successive lines across the moving belt provide five columns of fixtures 59 moving through the chamber of the oven 51.

In each fixture 59, the funnel 61 is tipped so that the open end of the neck 67 thereof is tipped from vertical toward the drive pulley 57 by an acute angle 69 of about 15° and also towards the center of the belt 53 by an acute angle 71 of about 10°. Vertically under the neck 67 of each column of fixtures and also under the belt 53 is a manifold 73 with a plurality of spaced-out nozzles 75 directed vertically upward through the belt 53. Each manifold 73 connects to a header 77, which connects to a source of compressed air (not shown) through a manual valve 79, a constant pressure outlet valve 81, a dryer 83, a flow meter 85 and a control valve 87. The array of nozzles 75 extends over only a portion of the heating-up zone of the oven.

In this embodiment, the belt 53 with the fixtures 59 moves at a substantially constant rate in the direction of the drive pulley 57. At the same time, dry air passing through the header 77 is distributed to the five manifolds 73 and then issues as constant streams from the nozzles 75 directed vertically upwardly through the belt 53. As the fixtures 59 move, the open ends of the necks 67 of the funnels therein pass over successive jet streams issuing from the columns of nozzles below. The open ends of the necks 67 are alternately in and out of the jet streams issuing from successive nozzles, which are spaced apart sufficiently. The effect on each funnel 61 is to experience jets of oxygen-containing gas intermittently directed into the neck thereof.

Figure 5:
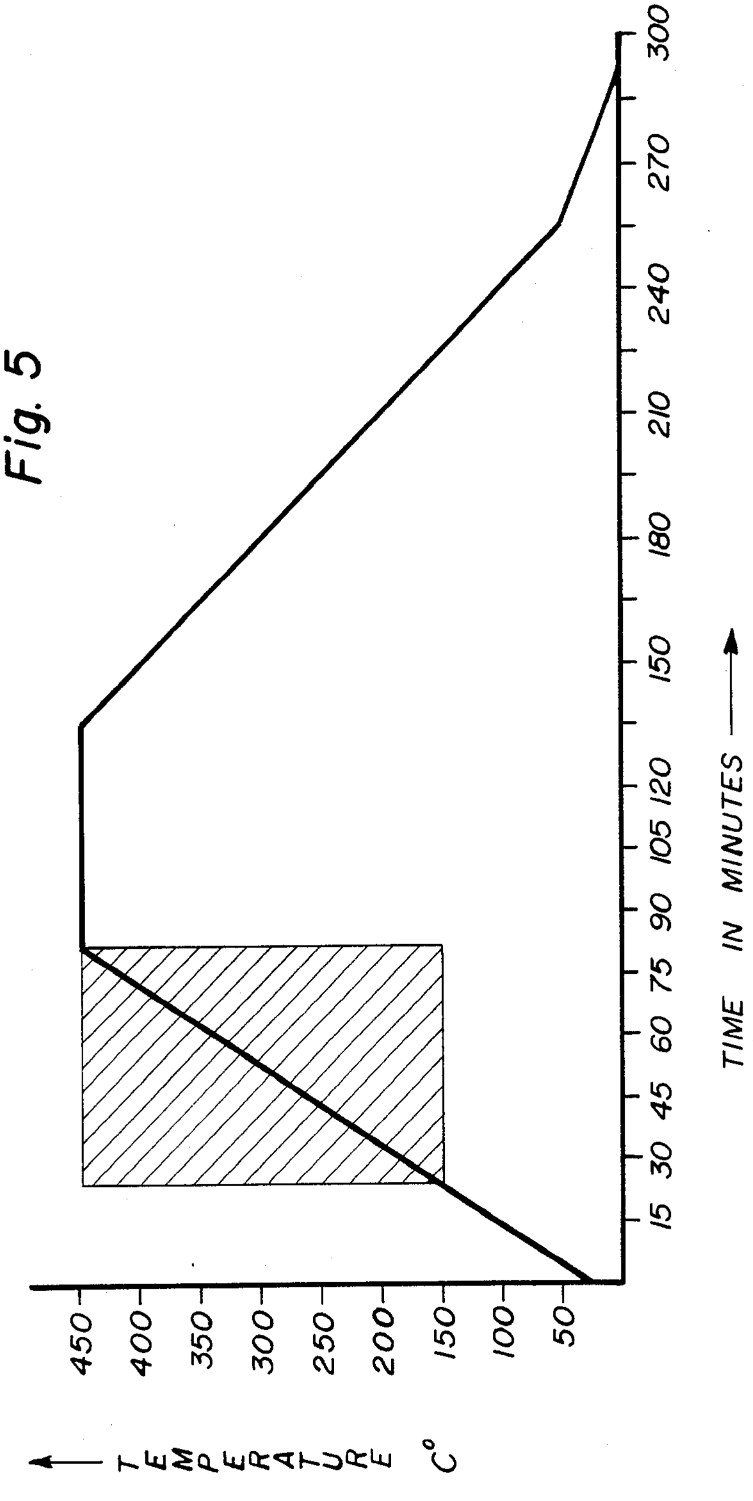
FIG. 5 is a graph representing the temperature profile experienced by the leading edge of a tube passing through the oven shown in FIG. 2.

FIG. 5 is a curve 89 showing the temperature in °C. of the leading edges of the seal lands of a typical 25V 100° panel-funnel assembly as it passes through the oven 51 versus elapsed time in the oven 51 in minutes. The cross-hatched area in FIG. 5 indicates the portion of the heating cycle during which the jets of air are applied. No jets are applied elsewhere in the cycle. Except for convection currents, which are generally quite weak, the atmosphere in the oven is essentially still.

What is claimed is:

1. In a method for fabricating a cathode-ray tube including heat-sealing a glass faceplate panel to a glass funnel, said funnel having an open, relatively-narrow neck attached to the narrow end thereof, and, at the same time, baking-out substantial amounts of organic matter from coatings on surfaces inside said panel and said funnel, said heat-sealing and baking-out being conducted at elevated temperatures in a substantially-quiescent atmosphere, said method including a heating-up period and a cooling-down period, the improvement comprising intermittently directing jets of oxygen-containing gas into the neck of said funnel at least during the heating-up period, and wherein the longitudinal axis of said neck is at an acute angle with respect to the direction of flow of said jets.

2. The method defined in claim 1 wherein said improvement is conducted at temperatures in the range of 150° to 450° C.

3. The method defined in claim 1 wherein said jets are flowing for at least 20 seconds and not flowing for at least 20 seconds during each of a plurality of five-minute intervals.

4. The method defined in claim 1 wherein said jets are flowing for a substantial portion of each of a plurality of one-minute intevals.

5. The method defined in claim 4 wherein said jets are flowing for about 20 seconds during each of said intervals.

6. The method defined in claim 1 wherein said oxygen-containing gas is air.

7. The method defined in claim 1 wherein said oxygen-containing gas is air having a dew point of less than −40° C.

8. The method defined in claim 1 wherein said longitudinal axis is at an angle of about 15° with respect to the direction of flow of said jets.

* * * * *